(12) United States Patent
Dain et al.

(10) Patent No.: US 7,823,394 B2
(45) Date of Patent: Nov. 2, 2010

(54) THERMAL INSULATION TECHNIQUE FOR ULTRA LOW TEMPERATURE CRYOGENIC PROCESSOR

(75) Inventors: John Dain, Hollister, CA (US); Boyd Bowdish, Los Gatos, CA (US); Nick Henneman, Tres Pinos, CA (US)

(73) Assignee: Reflect Scientific, Inc., Orem, UT (US)

( * ) Notice: Subject to any disclaimer, the term of this patent is extended or adjusted under 35 U.S.C. 154(b) by 572 days.

(21) Appl. No.: 11/934,696

(22) Filed: Nov. 2, 2007

(65) Prior Publication Data
US 2009/0114656 A1    May 7, 2009

(51) Int. Cl.
*F17C 3/08* (2006.01)

(52) U.S. Cl. .............................. 62/45.1; 62/100; 62/268

(58) Field of Classification Search ................. 62/45.1, 62/47.1, 48.3, 459.9, 440, 259.1, 457.1, 100, 62/169, 170, 269; 220/560.15, 592.27
See application file for complete search history.

(56) References Cited

U.S. PATENT DOCUMENTS

| | | | |
|---|---|---|---|
| 3,601,186 A | 8/1971 | Smith et al. | |
| 3,673,810 A | 7/1972 | Hales et al. | |
| 3,699,694 A | 10/1972 | Hales et al. | |
| 4,040,268 A | 8/1977 | Howard | |
| 4,060,400 A | 11/1977 | Williams | |
| 4,257,752 A | 3/1981 | Fogarty | |
| 4,276,752 A | 7/1981 | Modler et al. | |
| 4,454,723 A | 6/1984 | Weasel, Jr. | |
| 4,580,411 A | 4/1986 | Orfitelli | |
| 4,768,535 A | 9/1988 | Marx et al. | |
| 4,860,545 A | 8/1989 | Zwick et al. | |
| 5,331,824 A | 7/1994 | Miller et al. | |
| 5,353,749 A | 10/1994 | Seibel et al. | |
| 5,440,894 A | 8/1995 | Schaeffer et al. | |
| 5,600,966 A | 2/1997 | Valence et al. | |
| 5,743,111 A | 4/1998 | Sasaki et al. | |
| 5,884,696 A | 3/1999 | Loup | |
| 5,910,167 A | 6/1999 | Reinke et al. | |
| 5,947,195 A | 9/1999 | Sasaki | |
| 6,128,914 A | 10/2000 | Tamaoki et al. | |
| 6,185,957 B1 | 2/2001 | Voss et al. | |
| 6,345,509 B1 | 2/2002 | Garlov et al. | |
| 6,390,187 B1 | 5/2002 | Marechal et al. | |
| 6,438,990 B1 | 8/2002 | Hertling | |
| 6,453,680 B1 | 9/2002 | Allen | |
| 6,490,877 B2 | 12/2002 | Bash et al. | |
| 6,543,240 B2 | 4/2003 | Grafton | |
| 6,578,367 B1 | 6/2003 | Schaefer et al. | |
| 6,606,882 B1 | 8/2003 | Gupte | |
| 6,619,047 B2 | 9/2003 | Ziegler et al. | |
| 6,708,502 B1 * | 3/2004 | Aceves et al. | ................. 62/45.1 |
| 6,804,976 B1 | 10/2004 | Dain | |
| 7,263,845 B2 | 9/2007 | Lee | |

(Continued)

*Primary Examiner*—Mohammad M Ali
(74) *Attorney, Agent, or Firm*—Tran & Associates

(57) ABSTRACT

Systems and methods are disclosed to insulate a vessel includes placing a plurality of shells on all sides of the vessel without providing a direct energy pathway from outer walls of the vessel to the inner walls of the vessel; placing the shells under a vacuum; cryogenically cooling the shells to a cryogenic temperature; and while under vacuum, allowing the shell temperature to rise from the cryogenic temperature to ambient temperature.

20 Claims, 8 Drawing Sheets

U.S. PATENT DOCUMENTS

| | | | |
|---|---|---|---|
| 2002/0017526 A1* | 2/2002 | Norio et al. | 220/592.2 |
| 2003/0087598 A1* | 5/2003 | Adams | 454/254 |
| 2003/0146224 A1* | 8/2003 | Fujii et al. | 220/592.27 |
| 2005/0138956 A1 | 6/2005 | Okuda et al. | |
| 2006/0000733 A1* | 1/2006 | Albritton et al. | 206/432 |
| 2006/0086741 A1 | 4/2006 | Bacon et al. | |

\* cited by examiner

| |
|---|
| Position a plurality of shells such as foams on all sides of a vessel without a direct energy pathway from outer walls of the vessel to the inner walls of the vessel (1) |
| | |
| Place the foam shells under vacuum (2) |
| | |
| Cryogenically cool the foam shells (3) |
| | |
| While under vacuum, allow the shell temperature to rise from a cryogenic temperature to an ambient temperature (4) |

FIG. 1

THERMAL INSULATION TECHNIQUE FOR ULTRA LOW TEMPERATURE CRYOGENIC PROCESSOR

BACKGROUND OF THE INVENTION

This invention relates to a thermal insulation technique for ultra low temperature cryogenic processors.

Vacuum insulating panels are used conventionally for thermal insulation. Known vacuum insulating panels consist of a pre-compressed porous filling, a porous pressboard or an open-cell rigid foam as substrate, which is enveloped by a gas-tight film, wherein the film is heat-seated or bonded after the evacuation.

The following, for example, are used as filling materials for vacuum insulating panels: precipitated and dried silicas, silica gels, fly ash, open-cell foams on an organic base such as open-cell rigid polyurethane foams or bonded rigid polyurethane foam paste. Vacuum insulating panels of this type are used in the manufacture of cold rooms, e.g., refrigerators or refrigerated containers, with the latter being inserted between the outer and inner casing and the gap left between the outer and inner casing being filled with foam.

The fitting of the vacuum insulation panels into refrigerator casings nevertheless presents problems. According to the current state of the art, they are bonded onto a plate—for example, a metal cassette—by means of a double-sided adhesive film. This combination plate can then be processed further into a sandwich panel, for example, a refrigerator door, wherein the cavity left is conventionally filled with foam.

As a result, on the one hand, a complicated, multi-step process is required, and on the other hand, the insulation volume is affected by the foam, which is less efficient in insulation terms when compared with a vacuum insulation panel. Arrangements of this type are also, to only a limited extent, without thermal bridges.

U.S. Pat. No. 6,164,030 discloses an apparatus which consists of a rigid plate and a vacuum insulation panel, in which the vacuum insulation panel is fixed to the rigid plate by a polyurethane foam applied as a liquid reaction mixture, wherein the vacuum insulation panel contains open-cell rigid plastics foam and/or open-cell rigid plastics foam recyclate.

SUMMARY

In a first aspect, a method to insulate a vessel includes placing a plurality of shells on all sides of the vessel without providing a direct energy pathway from outer walls of the vessel to the inner walls of the vessel; placing the shells under a vacuum; cryogenically cooling the shells to a cryogenic temperature; and while under vacuum, allowing the shell temperature to rise from the cryogenic temperature to ambient temperature.

Implementations of the above aspect may include one or more of the following. The process can include milling spaced-apart pathways in the shells. Such millings facilitate an evacuation of the trapped spaces of the shells and allowing for a desorbtion of a surface area of the shells. A vacuum pump can maintain a partial pressure of the vacuum in the vessel to below approximately 10 millitorr. The vacuum pump is a non-oil based pump. Initially, the process evacuates the shells to a total pressure of approximately 500 millitorr. The process then cryogenically cools the shells to a temperature of less than approximately −175° C. Next, gettered gases can be removed by a pseudo thermo/kinetic energy transfer during the rise to ambient temperature. The shells can be a foam material. The shell layout prevents heat gain energy from migrating from the outer walls to the inner walls by presenting at least two 90 degree flow pathway changes.

In another aspect, an insulated vessel includes outer walls; inner walls spaced apart from the outer walls to define a vacuumed insulation volume; and a plurality of shells placed in the insulation volume without providing a direct energy pathway from outer walls of the vessel to the inner walls of the vessel, wherein the shells are cryogenically cooled to a cryogenic temperature and while under vacuum, the shell temperature is raised from the cryogenic temperature to ambient temperature.

Implementations of the above aspect may include one or more of the following. Spaced-apart pathways can be milled in the shells. The pathways facilitate an evacuation of the trapped spaces of the shells and allowing for a desorbtion of a surface area of the shells. A vacuum pump can maintain a partial pressure of the vacuum in the insulation volume to below approximately 10 millitorr. The vacuum can be provided using a non-oil based pump. The pump can initially evacuate the insulation volume to a total pressure of approximately 500 millitorr. A cryogenic heat exchanger can cryogenically cool the shells to a temperature below approximately −175° C. Gettered gases can be removed by a pseudo thermo/kinetic energy transfer during the rise to ambient temperature. Each shell can be a foam material. The shells prevent heat gain energy from migrating from the outer walls to the inner walls by presenting at least two 90 degree flow pathway changes.

Advantages of the preferred embodiment may include one or more of the following. The system has a thermal insulation technique that combines a highly non-compressible foam and traditional vacuum processing techniques to produce a novel insulation technique. This technique can be used to reduce the heat gain properties of a low temperature vessels and allow for the manufacture of square, flat walled vacuum chambers that demonstrate no structural deformation or metal fatigue during the evacuation process. The theoretical R-value of this technique is greater then 100 as measured by the International System of Units—RSI.

BRIEF DESCRIPTION OF THE DRAWINGS

FIG. 1 shows an exemplary process to insulate a vessel.

DESCRIPTION

Figure 2A:
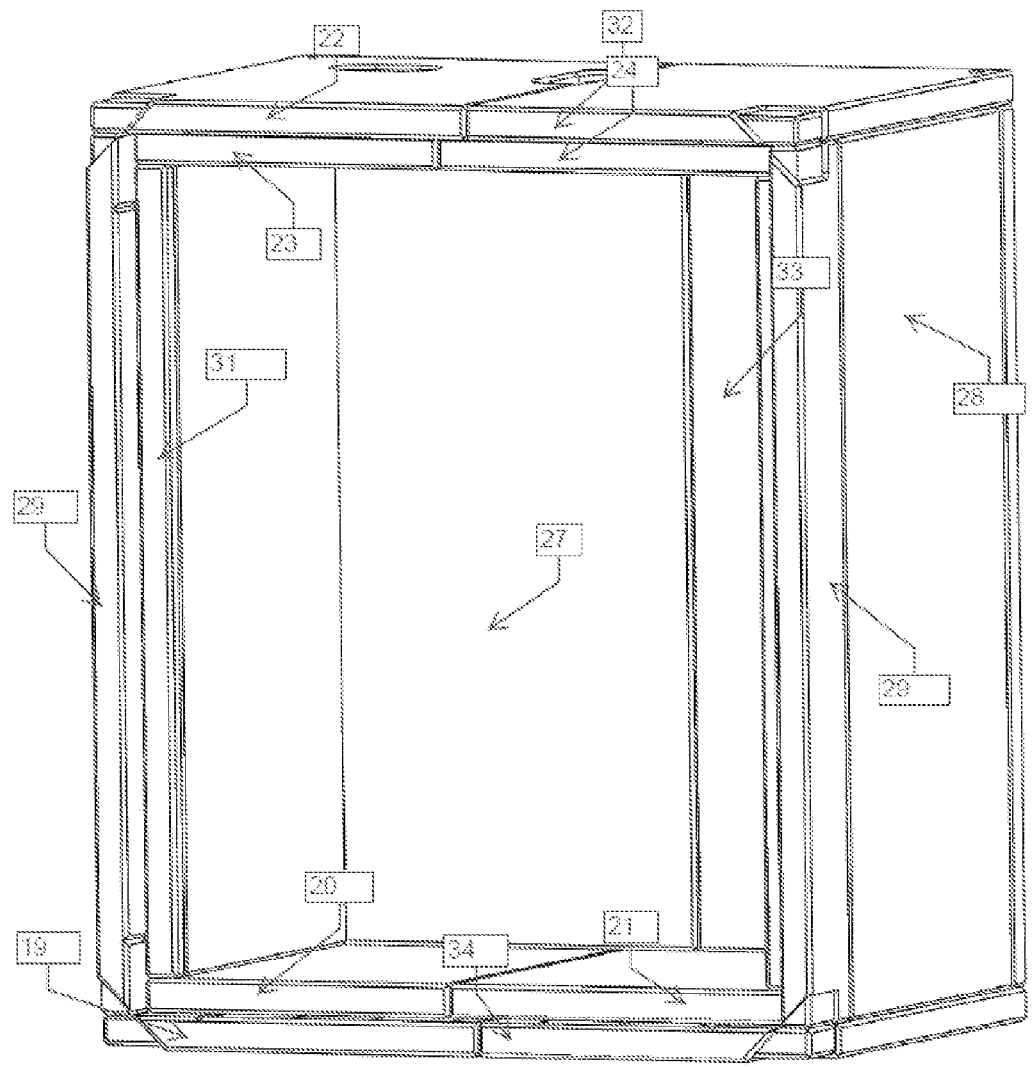
FIG. 2 shows an exemplary shell arrangement.
Figure 2B:
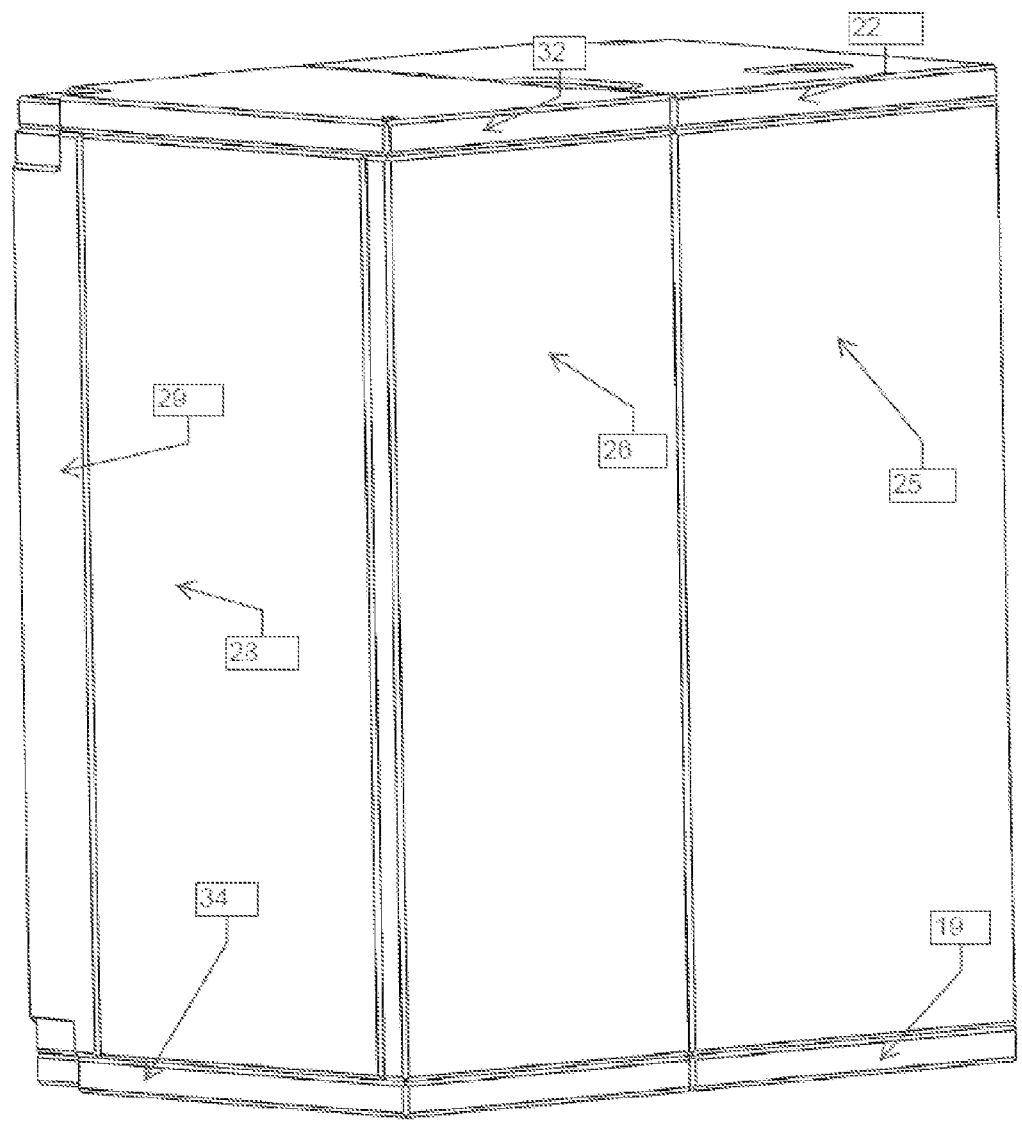
Figure 2C:
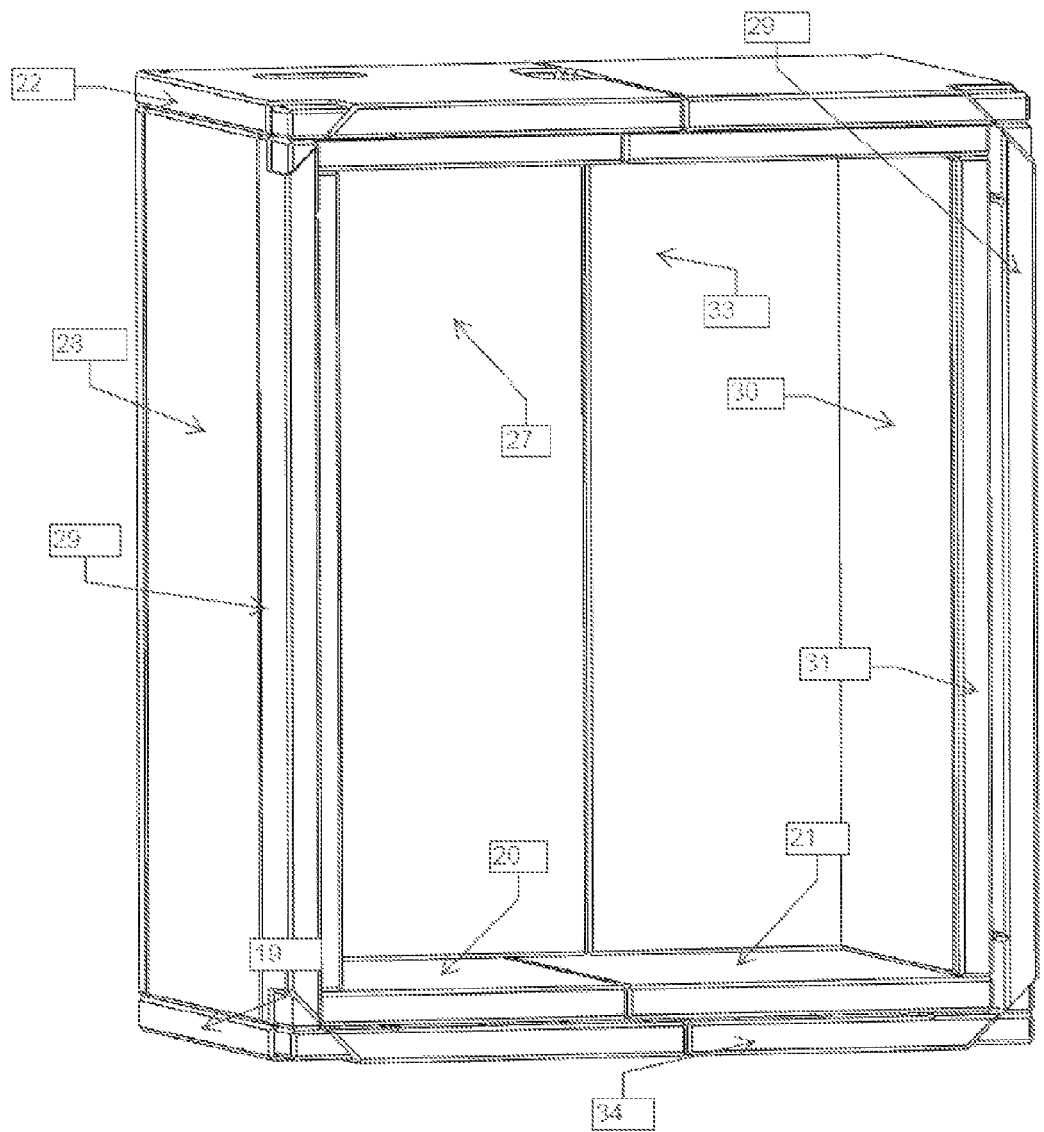
Figure 2D:
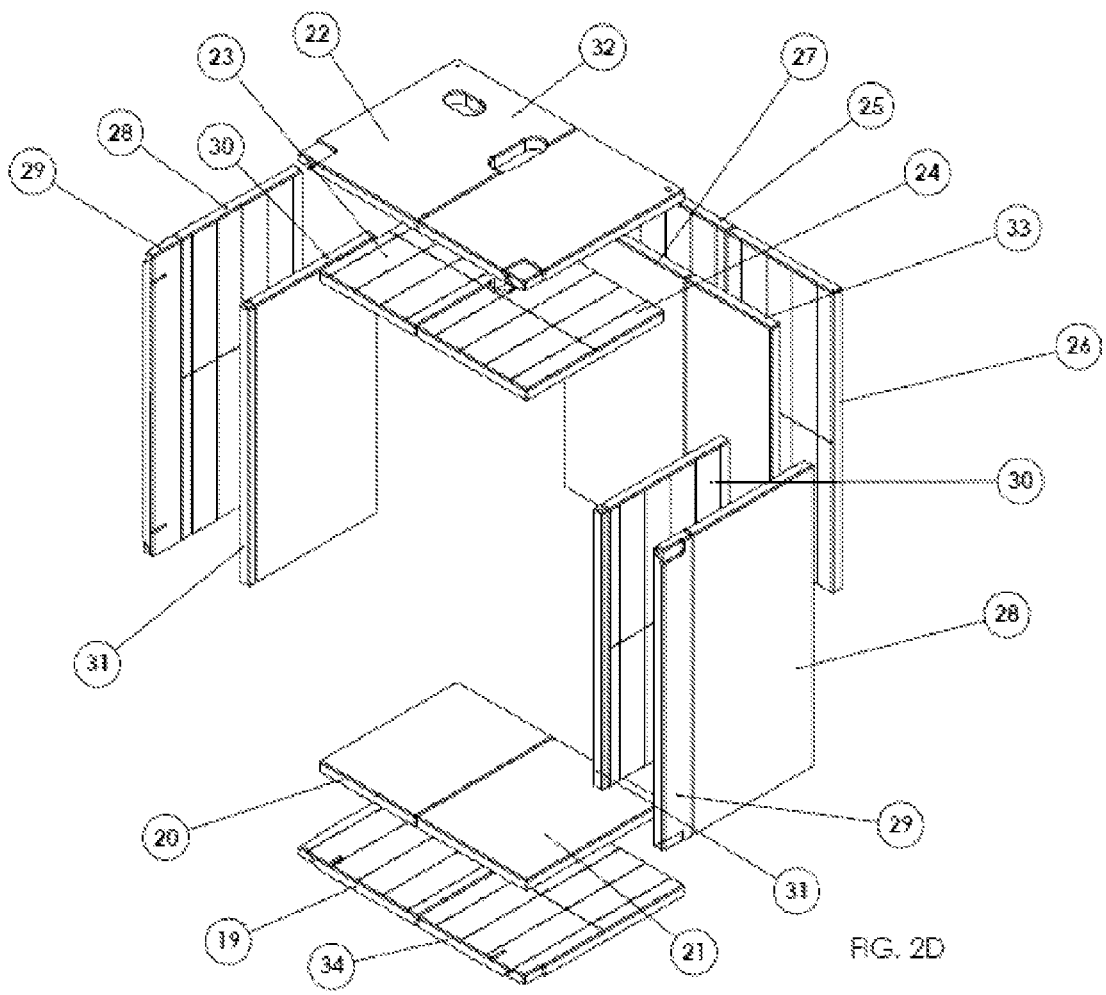

FIG. 1 shows an exemplary process to insulate a vessel such as a biological storage chamber, among others. The process forms a plurality of foam shells on all sides of a vessel without a direct energy pathway from outer walls of the vessel to the inner walls of the vessel (1). Next, the process places the foam shells under vacuum (2). The process then cryogenically cools the foam shells (3); and while under vacuum, allowing the foam shell temperature to rise from a cryogenic temperature to an ambient temperature (4).

FIG. 2 shows an exemplary shell arrangement. The shell can be made of foam, among other materials. In FIG. 2, two outside back shell portions 25 and 26 are positioned adjacent each other. Portions 25 in turn faces inner back shell portions 27 and 33. These portions in turn are surrounded on left and right sides by a pair of side shell assembly having an outside side shell portions 28 and 29 that face inside side shell portions 30 and 31. The back shell portions and the side shell portions are in turn connected to top and bottom shell assemblies. The bottom shell assembly includes outer bottom shelf portions 19 and 34 facing inner bottom shelf portions 20-21. The top shell assembly includes outer top shelf portions 22 and 32 that face inner top shelf portions 23-24. The top shell assembly include openings 22 that allow cryogenic coolants to enter and exit a payload chamber as shown in more details below.

In one embodiment, each foam piece is four inches thick and is made from a polyisocyanurate material. The vacuum vessel is made of austenitic stainless steel, type 302, 304, 316, 321 or 347. The foam design places foam sections on all sides of a vessel and will be designed so that there are no direct energy pathways from the outer walls to the inner wall. The arrangement challenges any heat gain energy from migrating from the outer wall to the cryogenically tempered inner surface by presenting at least two 90 degree flow pathway changes. All energy migrating from outer to inner is gettered by the kinetic properties of the foam, while in molecular flow regime. All foam sections will have vacuum pathways milled into them which are 0.065" in cross section, spaced in an arrangement that facilitates the evacuation of the trapped spaces of the foam sections and allowing for the desorbtion of the surface area of the foam to a minimum of 100 monolayers in one embodiment. After the milling operation, the foam itself has enough surface area and flow obstructions as to prevent serious back flow of contaminates into the vacuum space. Vacuum channels are placed on the foam to allow for two processes to happen. First, the channels facilitate the general evacuation of the chambers and second, the channels facilitate the desorbtion of water vapor from the foam surface. The vacuum processing reduces the partial pressure of the vacuum vessel to a point lower than 10 millitorr as measured by a thermocouple or similar total pressure gauge. The use of non-oil based vacuum pumps prevents the back streaming of residual water and oil vapor with its contaminating gas load.

In addition to using oil free vacuum pumps, a cold processing technique is applied to the shells. The technique includes of three separate steps.

Firstly, the assembly is evacuated to a total pressure of approximately 500 millitorr. The specific ultimate pressure is not important.

Secondly, the assembly is then cryogenically cooled to a temperature of no more then −175° C. as measured on the inner wall of the vacuum chamber. This getters contaminant gases onto the inner wall of the vacuum chamber via thermodynamic processes, thus conditioning the foam.

Lastly, while the vacuum pump system is connected and applied to the vacuum chamber, the temperature is allowed rise to ambient. The vacuum pump removes all of the gettered gases by way of a pseudo thermo/kinetic energy transfer.

The following examples are intended to explain the invention in greater detail, but without limiting it in its scope. In one exemplary embodiment, the foam is a Polyisocyanurate Insulation that has the following specifications:

Compressive Strength3 D 1621lb/in2 kPa
Parallel to Rise (Thickness) 140 970
Perpendicular to Rise (Width) 130 900
Perpendicular to Rise (Length) 130 900
Compressive Modulus D 1621 lb/in2 kPa
Parallel to Rise (Thickness) 3100 21400
Perpendicular to Rise (Width) 2800 19300
Perpendicular to Rise (Length) 2800 19300
Shear Strength C 273 lb/in2 kPa
Parallel to Rise 80 550
Shear Modulus C 273 lb/in2 kPa
Parallel to Rise 800 5500
Tensile Strength D 1623 lb/in2 kPa
Parallel to Rise (Thickness) 80 550
Tensile Modulus D 1623 lb/in2 kPa
Parallel to Rise (Thickness) 2800 19300
Flexural Strength C 203 lb/in2 kPa
Parallel to Rise 160 1100
Flexural Modulus C 203 lb/in2 kPa
Parallel to Rise 5800 40000
k-Factor (75° F. (24° C.) mean temp.) C 518
BTU·in/hr·ft2·° F. W/m° C.
Initial 0.180 0.026
Aged 180 days @ 75° F. (24° C.) 0.200 0.029
R-Value/in (75° F. (24° C.) mean temp.) C 518
Hr·ft2·° F./BTU m2·° C./W
Initial 5.5 0.97
Aged 180 days @ 75° F. (24° C.) 5.0 0.88
Closed Cell Content D 2856% 97% 97
Water Absorption C 272% by Volume 0.7% by Volume 0.7
Water Vapor Permeability E 96 Perm-Inch 1.1
(ng/Pa·s·m) 1.6
Dimensional Stability4 D 2126
@−40° F. (−40° C.), 7 days
Length % Change −0.3% Change −0.3
Volume % Change −0.1% Change −0.1
@ 158° F. (70° C.)/97% Relative Humidity, 7 days
Length % Change 0.4% Change 0.4
Volume % Change 0.7% Change 0.7
@−10° F. (−23° C.), 7 days
Length % Change −0.2% Change −0.2
Volume % Change −0.7% Change −0.7
@ 300° F. (149° C.), 7 days
Length % Change −0.4% Change −0.4
Volume % Change −1% Change −1
Service Temperature5° F. −297 to +300° C. −183 to +149

Figure 3:
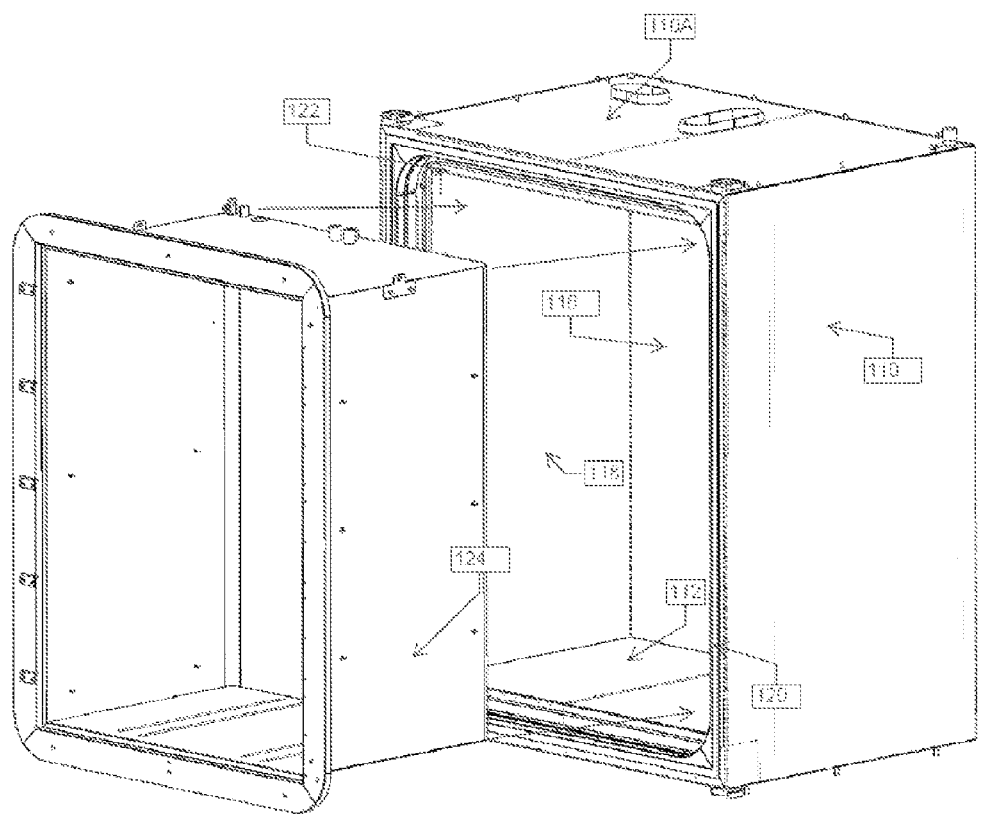
FIG. 3 shows an assembly of the vessel with outer walls, shells, and the payload chamber.

FIG. 3 shows an assembly of a vessel 110 with outer walls, shells, and inner walls formed by the exterior of the payload chamber. FIG. 3 shows the five-sided outer "tub" 110A assembled with a lining of insulation, into which is inserted metal inner "tub" 124, typically of 16 gauge stainless steel, having a front flange which extends around the perimeter. This is seamlessly laser-welded to the alter tub 110 all around in a no leak manner to form an insulation tub 110B with the five hollow walls totally enclosed and filled with the shell portions 112, 122, 116, 118, 120 and 122. More details on the vessel 110 are disclosed in co-pending application Ser. No. 11/890,451, filed on Aug. 7, 2007, the content of which is incorporated by reference.

Figure 4:
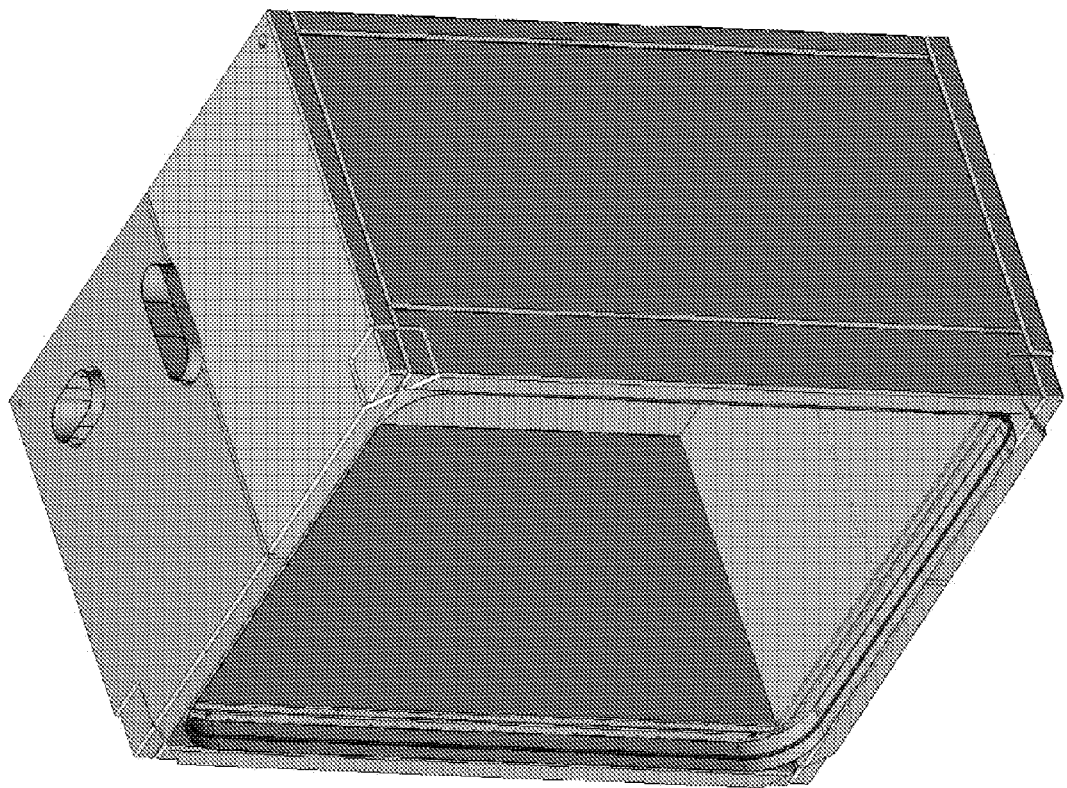
FIG. 4 shows an exemplary payload chamber enclosed by the shell.

FIG. 4 shows an exemplary assembled payload chamber enclosed by an insulation volume where the shells are placed. In one embodiment, this shell portions can be first purged of moisture at 120 degrees C. then evacuated at 100 degrees C. to a vacuum of approximately 0.0002 torr (i.e. 02 millitorrs, 1 torr=1/760 atmosphere) and then sealed off as a vacuum-insulation-walled enclosure.

The rigidity and high compressive strength of the shell material serve to counteract and minimize inward bending distortion of the two opposed metal sheets due to stress from the internal vacuum and external atmospheric pressure as the shell material provides sufficient compressive strength.

Figure 5:
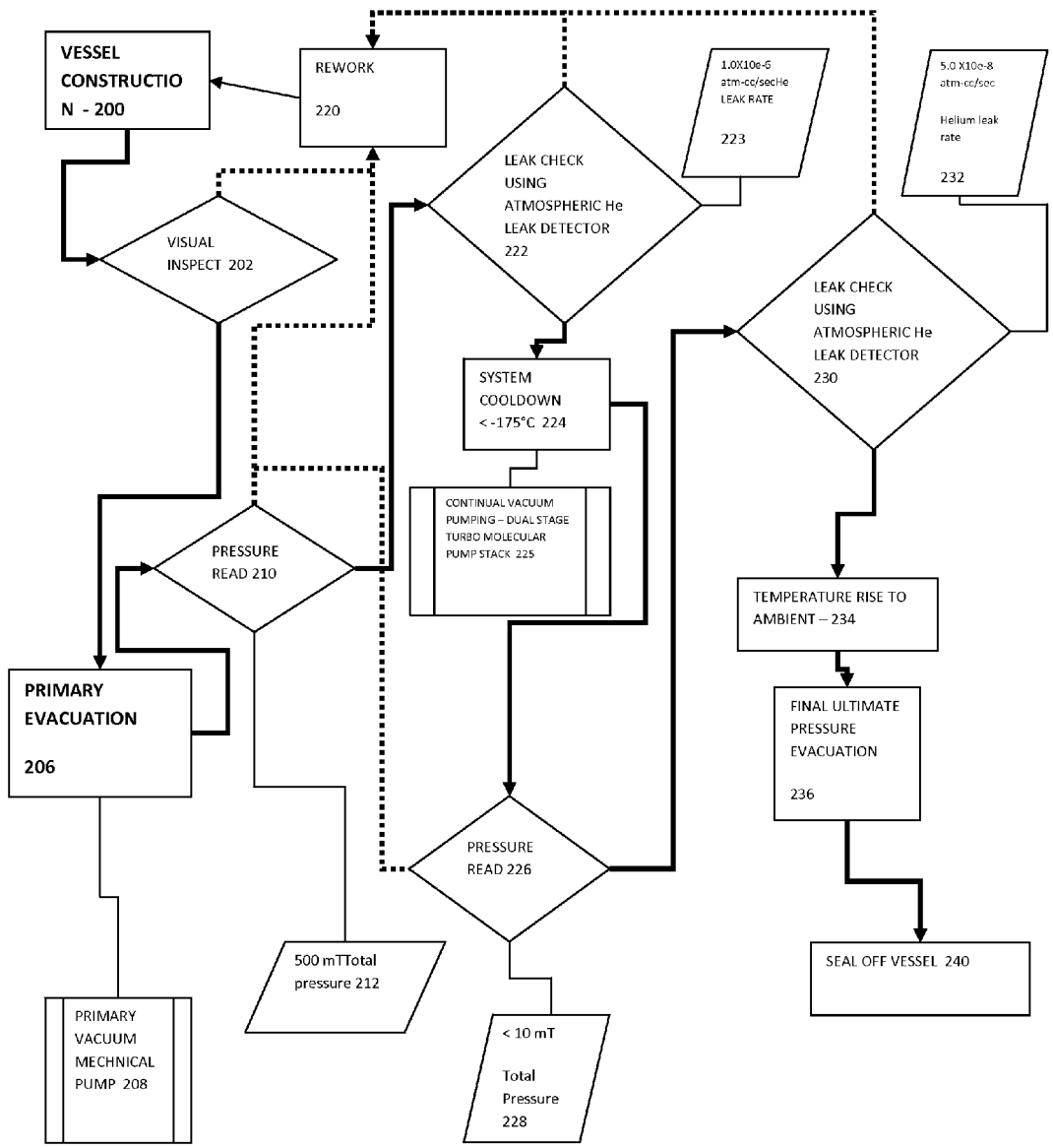
FIG. 5 shows an exemplary cold vacuum processing operation.

FIG. 5 shows an exemplary cold vacuum processing operation. First, the vessel is constructed (200) and a visual inspection is done (202) in accordance with a manufacturing protocol (204). If the visual inspection passes, a primary evacuation operation is done (206). The primary evacuation can be done using a mechanical pump (208). After the primary evacuation, a pressure reading is done (210). The reading tests that a total pressure of about 500 millitorr is in the chamber within 60 minutes (212). Next, the system performs a leak check using an atmospheric helium leak detector (222). The system confirms that the leak rate is less than 10e−6 atm-cc/sec in one embodiment (223). Next, the system is cooled to less than −175 degree C. (224) while a continual vacuum pumping dual stage turbo molecular pump is operated (225). Next, a pressure reading is taken (226). Preferably, the pressure is less than 10 millitorr (228). The system also checks for leak using the atmospheric helium leak detector (230). The helium leak rate is ascertained (232). The temperature of the vessel is then allowed to rise to ambient temperature while under vacuum (234). A final ultimate pressure evacuation is done (236) and the vessel is sealed (240).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method to insulate a vessel, comprising:
   a. placing a plurality of shells on all sides of the vessel without providing a direct energy pathway from outer walls of the vessel to the inner walls of the vessel;
   b. placing the shells under a vacuum;
   c. cryogenically cooling the shells to a cryogenic temperature; and
   d. while under vacuum, allowing the shell temperature to rise from the cryogenic temperature to ambient temperature.

2. The method of claim 1, comprising milling spaced-apart pathways in the shells.

3. The method of claim 2, comprising facilitating an evacuation of the trapped spaces of the shells and allowing for a desorbtion of a surface area of the shells.

4. The method of claim 1, wherein the vacuum maintains a partial pressure of the vacuum in the vessel to below approximately 10 millitorr.

5. The method of claim 1, comprising providing vacuum using a non-oil based pump.

6. The method of claim 1, comprising initially evacuating the shells to a total pressure of approximately 500 millitorr.

7. The method of claim 1, comprising cryogenically cooling the shells to a temperature of less than approximately −175° C.

8. The method of claim 1, comprising removing gettered gases by a pseudo thermo/kinetic energy transfer during the rise to ambient temperature.

9. The method of claim 1, wherein the shells comprise a foam material.

10. The method of claim 1, wherein the shells prevent heat gain energy from migrating from the outer walls to the inner walls by presenting at least two 90 degree flow pathway changes.

11. An insulated vessel, comprising:
    a. outer walls;
    b. inner walls spaced apart from the outer walls to define a vacuumed insulation volume; and
    c. a plurality of shells placed in the insulation volume without providing a direct energy pathway from outer walls of the vessel to the inner walls of the vessel, wherein the shells are cryogenically cooled to a cryogenic temperature and while under vacuum, the shell temperature is raised from the cryogenic temperature to ambient temperature.

12. The vessel of claim 11, comprising spaced-apart pathways milled in the shells.

13. The vessel of claim 12, wherein the pathways facilitate an evacuation of the trapped spaces of the shells and allowing for a desorbtion of a surface area of the shells.

14. The vessel of claim 11, wherein the vacuum maintains a partial pressure of the vacuum in the insulation volume to below approximately 10 millitorr.

15. The vessel of claim 11, comprising providing vacuum using a non-oil based pump.

16. The vessel of claim 11, comprising a pump coupled to the insulation volume to evacuate the insulation volume to a total pressure of approximately 500 millitorr.

17. The vessel of claim 11, comprising a heat exchanger coupled to the insulation volume to cryogenically cool the shells to a temperature below approximately −175° C.

18. The vessel of claim 11, wherein gettered gases are removed by a pseudo thermo/kinetic energy transfer during the rise to ambient temperature.

19. The vessel of claim 11, wherein each shell comprises a foam material.

20. The vessel of claim 11, wherein the shells prevent heat gain energy from migrating from the outer walls to the inner walls by presenting at least two 90 degree flow pathway changes.

* * * * *